Feb. 18, 1930.　　C. M. RASMUSSEN　　1,748,027
STOCK MUZZLE
Filed Sept. 21, 1927　　2 Sheets-Sheet 2
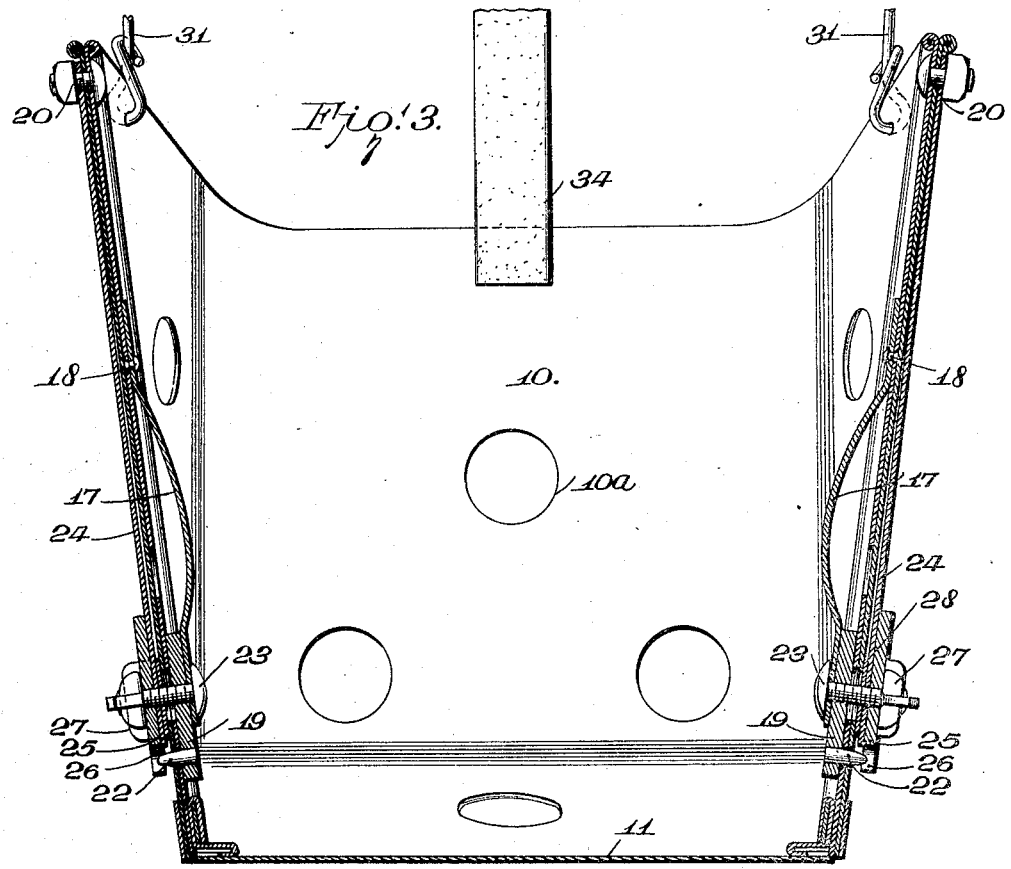
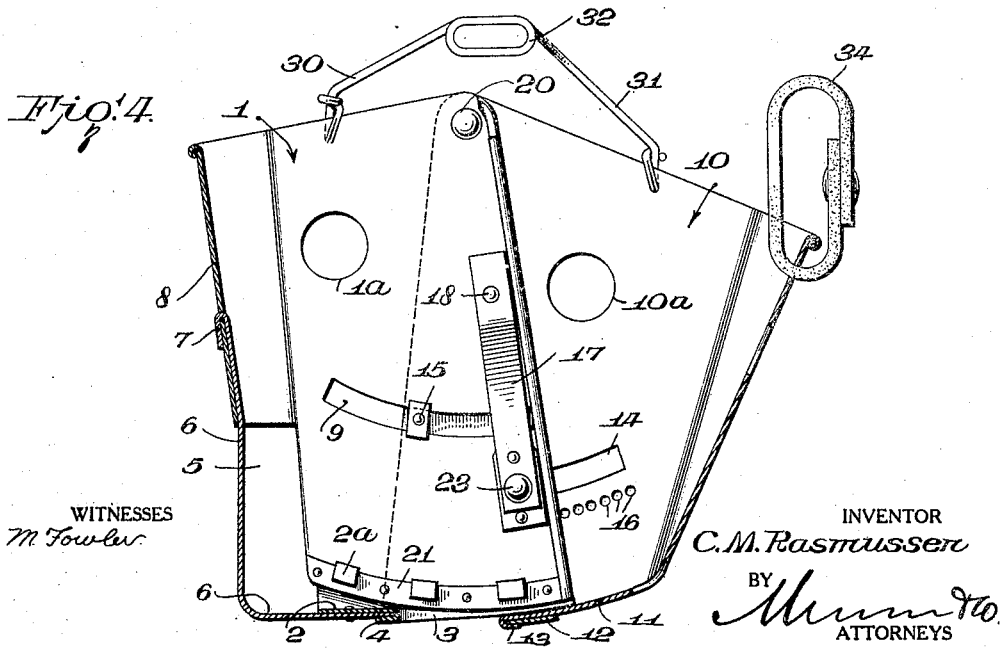

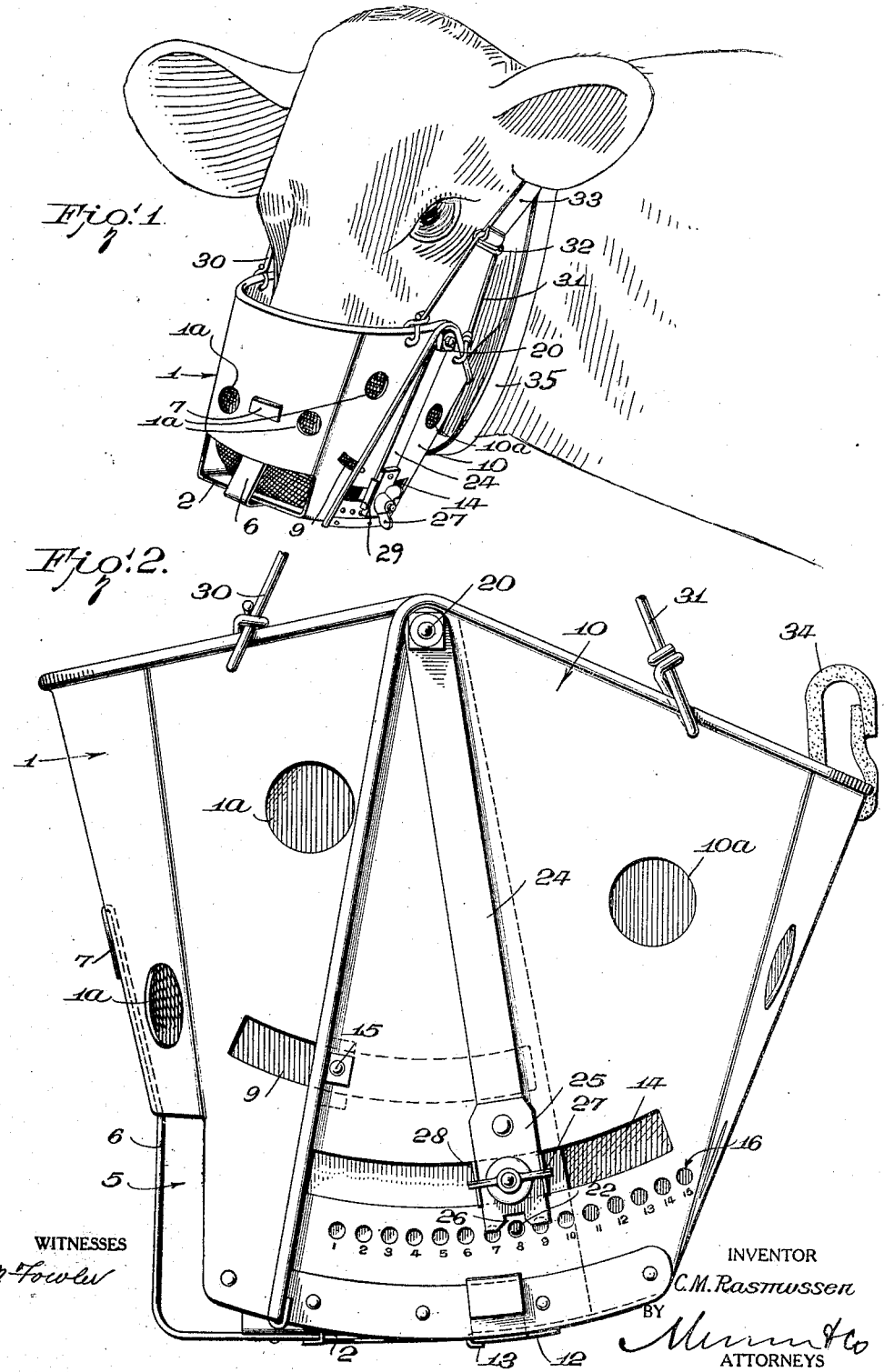

Patented Feb. 18, 1930

1,748,027

UNITED STATES PATENT OFFICE

CHRIS M. RASMUSSEN, OF DESCHUTES, OREGON

STOCK MUZZLE

Application filed September 21, 1927. Serial No. 221,106.

This invention relates to stock muzzles and more particularly to devices of this character designed for use in controlling the grazing by the animal wearing it, and it constitutes an improvement over my Patent #1,468,416, dated September 18, 1923.

A primary object of the invention is to provide a stock muzzle which may be quickly and easily adjusted without tools either while in use or when removed, and which may be cheaply made and is strong and durable.

Another object of the invention is to provide simple and efficient means for adjusting the size of the central feeding opening to permit the animal to bite off more or less grass as may be desired, the adjusting means being equipped with numbers so that the uninitiated may be acquainted with the size of the opening for use with an average cow to prevent dangerous bloating according to the kind of grass and the size or height of it, on which the animal is grazing.

Another object is to provide means for locking the parts in adjusted position so that horned animals cannot pry them apart or other objects be pushed between and alter the size of the feeding opening.

Another object is to provide a muzzle of this character having a detachable muzzle bottom or mouthpiece which, when worn, may be readily removed and replaced by another.

Another object is to provide a muzzle of this character having suspending bails mounted at each side thereof equipped with elongated loops of a width to receive the attaching strap so that when used with a proper depth of muzzle the animal is prevented from tipping the muzzle so as to free the nose from being confined therein.

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 represents a perspective view of the device shown applied,

Fig. 2 is a side elevation of the muzzle removed with the suspending bails broken off for convenience in illustration, Fig. 3 is a transverse vertical section of the muzzle, and Fig. 4 is a similar view taken in a plane at right angles to Fig. 3 showing the adjusting means at one side for varying the size of the feed opening.

In the embodiment illustrated, the muzzle is composed of a front section 1 and rear section 10 of sheet metal, preferably galvanized iron, shaped to fit when assembled around the mouth and nose of a cow or other animal. These sections 1 and 10 are beaded around their free edges and preferably reinforced by wires located within the beads to adapt them to withstand rough usage and to provide a smooth surface for contact with the animal's head. These sections are pivotally connected at their upper corners as shown at 20, bolts and nuts being preferably used as pivots to provide for the separation of the sections when desired.

These sections are both substantially U-shaped in cross section and have in-turned portions 2 and 11 respectively at their lower front ends which portions are designed to fit over the front of the animal's lower jaw and the end of its nose. The bottom portion 2 of the front section 1 has a cut-out portion 3 which is preferably V-shaped with the apex thereof extending inwardly and truncated. The edges of this V-shaped opening are provided with outwardly rolled flanges 4 to avoid danger of abrasion of the nose of the animal when eating. The edge of the portion 11 of the rear section 10 is reinforced by a strip 12 soldered or otherwise secured to the section and said strip has its front edge rolled outwardly and rearwardly to form a reinforcing bead and at the same time present a smooth surface for contact with the animal's jaw. The lower portion of the front wall of section 1 between the bottom thereof and at a point opposite the nostrils of the animal is cut out as shown at 5, so that no obstruction will be offered to the breathing of the animal.

The bottom portion 2 of the front section 1 is detachable so that when worn or broken, it may be removed and another substituted therefor. This bottom 2 is connected midway its width with the section 1 above the cut-out portion 5 thereof by a metal strip 6, the upper end of which is bent outwardly to form an attaching hook 7 which is passed through a slit 8 in the front wall of the section 1 as is shown clearly in Fig. 4 and then folded down flat against the outer face of said section. The other end of the strip 6 is extended laterally inward and riveted or otherwise secured to the bottom member 2, said strip being preferably located on the outer face of said bottom to avoid all possibility of abrasion of the animal's face or nose.

The side edges of the bottom 2 have attaching fingers 2ª which are passed between the strip 21 and the innner face of the section 1, the strip being riveted to said section, the space between the rivets forming a passage for the fingers 2ª which after being passed therethrough are bent over the strip 21 as is shown clearly in Fig. 4. It will thus be seen that when it is desired to remove the bottom 2 of section 1, all that is necessary is to pry open the fingers 2ª and the hook 7 and the bottom may be readily slipped out and another substituted therefor.

The sections 1 and 10 are provided at intervals with apertures 1ª and 10ª respectively, for ventilation.

Arranged in the opposite side walls of the rear section 10 near the bottom thereof are arcuate openings 14 and in the side walls of the front section in a plane above the openings 14 are similarly shaped forwardly extending openings 9, the latter being designed to receive headed buttons or knobs carried by the rear section and which slide back and forth in these openings or slots 9 and serve to guide the sections in their swinging movement on the pivots 20. Arranged in the side members of the rear section 10 below the slot-like openings 14 thereof are a series of apertures 16, fifteen of which are here shown and which are numbered from 1 to 15 respectively, as shown clearly in Fig. 2, and the purpose of which will be hereinafter more fully described.

Plate springs 17 are arranged on the inner faces of the side walls of the section 1 adjacent the outer vertical edges of said walls and are secured at their upper ends by rivets or otherwise, as shown at 18. These plate springs are preferably bowed outwardly as shown in Fig. 3 and carry at their lower ends metal plates 19 fixedly secured to the springs. Each of these plates 19 carries a laterally and outwardly projecting stud 22 positioned to enter one of the apertures 16 whereby the sections 1 and 10 are securely held in adjusted position. The studs 22 are secured against accidental release from the apertures by means of bolts 23 carried by the plates 19 and which extend through the slots 14 in the rear section 10.

Strips 24 are secured on the outer face of the rear section 10 being here shown mounted on the pivots 20 which connect the sections. At the lower ends of these strips 24 are metal plates 25 which overlie the slots 14 and are notched at their lower ends as shown at 25 to adapt them to straddle the studs 22 when the latter are projecting through the apertures 16 as is shown clearly in Figs. 2 and 3. The bolts 23 which are carried by the plate springs 17 extend through the slots 14 of the rear section 10 and through the plates with their threaded ends projecting outwardly and having mounted thereon wingnuts 27. When these nuts are tightened up on the bolts 23 the studs 22 will be securely locked in the apertures 16 thus holding the sections 10 and 1 in adjusted position. Arranged between the plates 25 and the outer face of section 10 on the bolts 23 are flanged clips 28, one flange 29 of which extends beyond the outer face of the plate and is designed to be engaged by the wing nut 27 and prevented from rotating beyond a predetermined point.

Two wire bails 30 and 31 are secured at their opposite ends to the upper edges of the respective sections adjacent the pivoted corners thereof as is shown clearly in Figs. 1, 2 and 4. These bails are shown connected with the sections by looping their ends through apertures in the sections and intermediate said ends is formed an oblong coil 32, the length of which corresponds to the width of a strap 33 which is designed to be passed over the head of the animal behind the ears thereof as shown in Fig. 1 to assist in securing the muzzle in operative position.

A leather loop 34 extends through a slot in the rear upper edge of the section 10 and is designed to receive a throat latch or strap 35 which also passes up over the head of the animal and operates to hold the muzzle securely in position.

From the above description it will be obvious that the muzzle may have the feeding opening at its lower end varied in size by swinging the sections 1 and 10 toward or away from each other and securing them by tightening up the nuts and bolts 27 and 23 in the manner above described.

Without further description it is thought that the features and advantages of the invention will be readily apparent to those skilled in the art, and it will of course be understood that changes in the form, proportion and minor details of construction may be resorted to, without departing from the spirit of the invention or the scope of the claims.

I claim:—

1. A stock muzzle comprising a body open at one end to fit over the nose portion of an animal, and composed of two sections substantially U-shaped in cross section said sections being pivotally connected at their upper or rear ends the other or front ends of the sections being arranged in lapping relation to slide circumferentially relative to each other, said sections having cooperating interlocking elements at their free ends for adjustably and fixedly connecting them.

2. A stock muzzle comprising a body open at one end to fit over the nose portion of an animal and composed of two sections substantially U-shaped in cross section and pivotally connected at one end, one of said sections having a series of circumferentially arranged apertures at its free end and the other having a stud for engagement with one of said apertures to adjustably connect the sections at this end, and means for locking said stud engaged with said aperture.

3. A stock muzzle comprising a body open at one end to fit over the nose portion of an animal and composed of two sections substantially U-shaped in cross section and pivotally connected at one end, one of said sections having a series of circumferentially arranged apertures at its free end and the other having a stud for engagement with one of said apertures to adjustably connect the sections at this end, and means for straddling said stud and holding it in adjusted position.

4. A stock muzzle comprising a body open at one end to fit over the nose portion of an animal and composed of two sections substantially U-shaped in cross section and pivotally connected at one end, one of said sections having a series of circumferentially arranged apertures at its free end and the other having a stud for engagement with one of said apertures to adjustably connect the sections at this end, and means for straddling said stud and holding it in adjusted position, said means comprising a spring plate carried by the apertured member and adapted to straddle said stud and hold the parts in adjusted position.

5. A stock muzzle comprising a body open at one end to fit over the nose portion of an animal and composed of two sections substantially U-shaped in cross section, said sections being pivotally connected at one end and lapping circumferentially at the other, one of said sections being slotted circumferentially and provided adjacent said slots with a parallel series of apertures, a spring pressed stud carried by the other section and adapted to interlockingly engage with one of said apertures to adjustably connect the sections at this end of the muzzle, and means carried by said spring and extending through said slot for locking the stud engaged with the aperture.

6. A stock muzzle comprising a body open at one end to fit over the nose portion of an animal, said body being composed of two sections substantially U-shaped in cross section and connected at one end, one of said sections being provided at its other end with an inturned bottom portion to extend under the lower jaw of the animal and the other section having a detachable bottom mounted for adjustment toward and away from the bottom of the first mentioned section and having an opening through which the animal may graze.

7. A stock muzzle comprising a body open at one end to fit over the nose portion of an animal and composed of two sections substantially U-shaped in cross section, said sections being connected at one end for pivotal movement and adjustably connected at the other end to move laterally toward and away from each other, one of said sections having a detachable bottom with an opening through which the animal may graze.

CHRIS M. RASMUSSEN.